May 13, 1969     S. SPIEGELMAN     3,444,044
REPLICATION OF MUTANT NUCLEIC ACIDS
Filed April 21, 1967
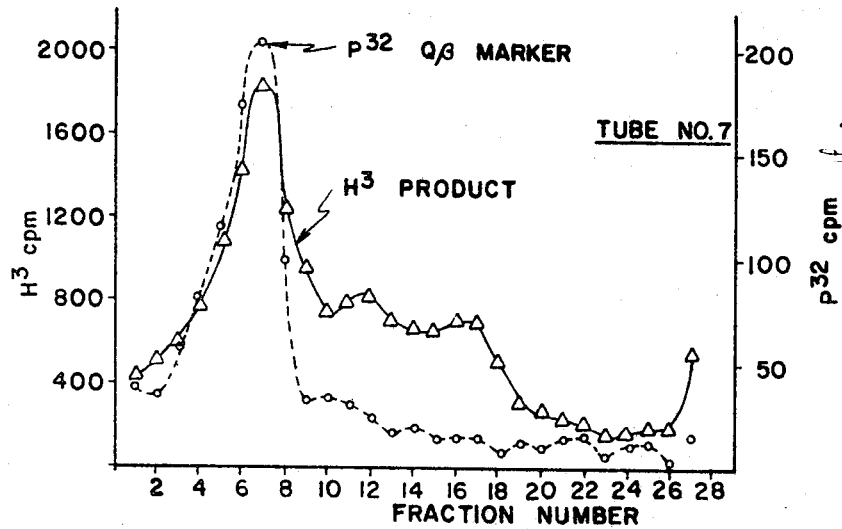
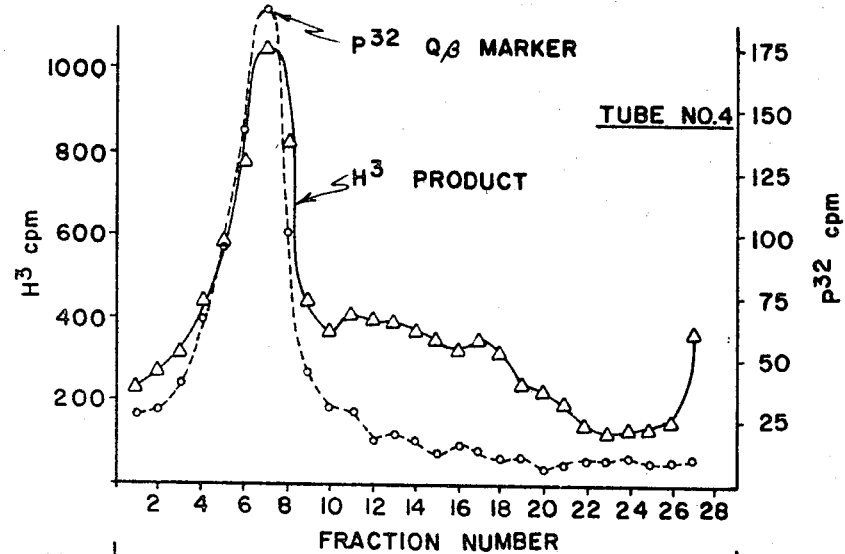
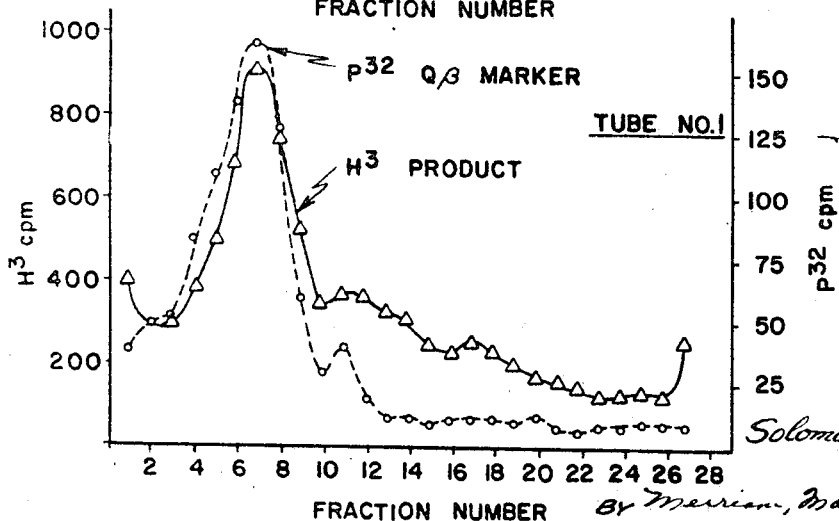
INVENTOR
Solomon Spiegelman

United States Patent Office 3,444,044
Patented May 13, 1969

---

3,444,044
REPLICATION OF MUTANT NUCLEIC ACIDS
Solomon Spiegelman, Champaign, Ill., assignor to University of Illinois Foundation, Urbana, Ill., a corporation of Illinois
Filed Apr. 21, 1967, Ser. No. 632,740
Int. Cl. C12d *13/06;* C08b *15/06*
U.S. Cl. 195—28                 15 Claims

ABSTRACT OF THE DISCLOSURE

Biologically active mutants of nucleic acids are synthesized in vitro in an enzymatic system from nucleotide bases, and a biologically active nucleic acid template.

---

Figure 2B:
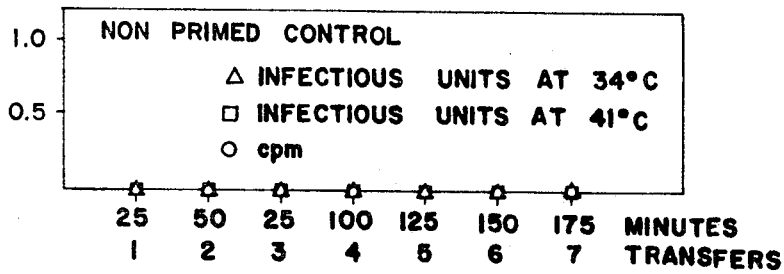

A United States Government contract or grant from or by the Public Health Service supported at least some of the work set forth herein.

This invention relates to methods and systems useful in the synthesis or replication in vitro of biologically active mutants of nucleic acids, including abbreviated nucleic acids, and biologically active nucleic acids produced therewith. As a result of the invention, one can make in vitro, for example, intact mutant nucleic acids derived from intact viral nucleic acids, which mutants have the ability to be replicated at an increased rate in vitro, but are noncompetent in that they do not produce or yield complete virus particles and are smaller than the intact viral nucleic acids from which they are derived.

My invention also demonstrates that the biological active nucleic acid that is the template for the synthesis in vitro of replicas of the template, is the instructive agent for this synthesis. This is shown by the fact that when the replicase was provided alternatively with two distinguishable biologically active RNA molecules, the product produced was always identical to the initiating template and was a self-duplicating entity. The RNA thus directed its own synthesis and there was no "activation" of preexisting RNA. The replicase was a passive follower of such instructions.

In demonstrating this, mutants were used for test purposes because the discriminating selectively of the replicase for its own genome as template made it impossible to employ heterologous RNA.

Further, my invention now provides an opportunity for studying the genetics and evolution of a self-duplicating, biologically active nucleic acid molecule under conditions permitting detailed control of environmental parameters and chemical components.

Still further, my invention opens a novel pathway toward the use of specific means for interferring with viral replication.

Before discussing my invention, a background of discoveries which preceded the invention shall first be described herein.

As used herein, the term "biologically active" includes material that possesses genetically competent characteristics or information essential to life or processes thereof. These biologically active materials are genetically competent and can transmit information to a system that will follow their instructions and translate them into biological sense. Nucleic acids which have the capability of being replicated are thus deemed to be biologically active regardless of whether or not they are capable of yielding or producing complete virus particles.

Living organisms, including humans, animals, plants, and microorganisms, use biologically active nucleic acids in the processes of storing and transmitting translatable genetic or hereditary information or messages and in the synthesis of the large number of tissue and body proteins. Two nucleic acids which can function under proper conditions as transmitters of the genetic code are DNA (deoxyribonucleic acid) and RNA (ribonucleic acid). In the living organism, these nucleic acids are generally combined with proteins to form nucleo-proteins.

These DNA and RNA molecules consist of comparatively simple constituent nucleotides (nitrogen base, pentose sugar moiety, and phosphate groups) polymerized into chains containing hundreds to thousands of these nucleotide units generally linked together through chemical bonds formed between the constituent phosphate and sugar groups.

These nitrogen bases are classified as purines or pyrimidines. The pentose sugar is either ribose or deoxyribose. Phosphoric acid groups are common to both DNA and RNA. On complete hydrolysis, DNA and RNA yield the following compounds:

| DNA | RNA |
|---|---|
| Adenine (A) | Adenine (A) |
| Cytosine (C) | Cytosine (C) |
| Guanine (G) | Guanine (G) |
| Thymine (T) | Uracil (U) |
| Methylcytosine | |
| Hydroxymethylcytosine | |
| Deoxyribose | Ribose |
| Phosphoric acid | Phosphoric acid |

It should be noted that the bases adenine (A), cytosine (C), and guanine (G) are common to both DNA and RNA; the base thymine (T) of DNA is completely replaced by the base uracil (U) in RNA. Methylcytosine occurs in small amounts in various deoxyribonucleic acids of animal origin and in wheat germ. In the DNA of several bacteriophages, cytosine is completely replaced by hydroxymethylcytosine.

Hydrolysis of these nucleic acids under appropriate conditions liberates a group of compounds known as nucleotides; these nucleotides consist of a purine or pyrimidine bases linked to pentose sugar moiety, which sugar moiety is esterified with phosphoric acid. These nucleotides are the subunits from which polymeric nucleic acids are constructed.

The ribonucleic acid polynucleotide structure may be represented diagrammatically, for example as follows:

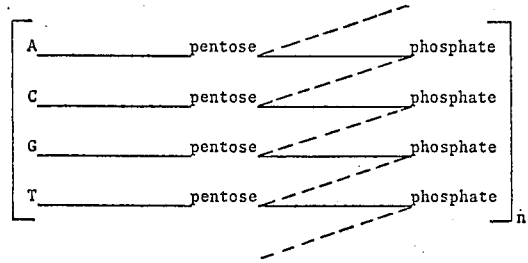

The dotted lines above represent ester groupings between one of the free hydroxyl groups of the pentose and of the phosphate groups. The subscript $n$ represents the number of repeating units which constitute the particular ribonucleic acid molecule.

Recent studies by chemists have shown that the DNA molecule has a doubly-stranded chain which, when shown in three dimensions, has two chains intertwined in a double helix. Each chain consists of alternating nucleotides, there being ten nucleotides in each chain per rotation of the helix, this ten nucleotide chain being about 34 A. in length. Both chains are right handed helices. These helices are evidently held together by hydrogen bonds formed between the hydrogen, nitrogen and oxygen atoms in the respective chains. The structure of the DNA molecule as it relates to the sequence of these bases in the molecule is now being elucidated; these structural studies are important, since it is now generally believed that this sequence of bases is the code by means of which the DNA molecule conveys or transmits its genetic information.

Chemists have shown that RNA generally is a single-stranded structure that has in its backbone the 5-carbon sugar ribose instead of the 5-carbon deoxyribose sugar found in DNA. As in DNA, the different nucleotides are linked together through the phosphate groups to form a long chain and thus to form an RNA molecule of high molecular weight. The RNA molecules do not seem to be as highly polymerized as the DNA molecules, and although there is evidence of hydrogen bonding between the RNA bases in some viruses (e.g., reovirus), it is thought that no helical structure is involved. As with DNA, base sequence studies are now being made with RNA, for the sequence of bases in the RNA is the code by which the RNA molecule conveys or transmits its genetic information.

In genes, the repository of hereditary factors of living cells and viruses, specific genetic information resides in the nucleotide sequence appearing in the DNA and RNA molecules. These sequences are transmitted, encoded, and reproduced in vivo by the complex enzymic systems present in living organisms. If no modification of the genetic DNA or RNA takes place, an exact duplicate or replicate of the nucleotide sequence is produced; this newly formed RNA or DNA in turn results in the production in vivo of an exact duplicate or replicate of a particular protein molecule. If, however, a change takes place in the DNA or RNA molecules, which change can be mediated by some mechanism such as radiation, a foreign chemical reactant, etc., a "mutation" takes place wherein the altered DNA or RNA molecules duplicate or replicate the "new" DNA or RNA and these in turn produce new or altered proteins as dicted by the altered nucleotide structure.

Copending application Ser. No. 535,596, filed Mar. 18, 1966, which is a continuation of application Ser. No. 509,458, filed Sept. 29, 1965, now abandoned, discloses a method and controlled system for synthesizing in vitro biologically active nucleic acids using an initiating amount of intact, biologically active (genetically competent) nucleic acid template, the replicase and the requisite nucleotides. With this method one may synthesize, for example, a ribonucleic acid molecule (RNA) identical with the intact template continuously over extended periods until or unless one arbitrarily or selectively stops the synthesis. This self-replication involves the true and complete transmission and translation from the intact template to the nucleotides, whereby the nucleotides are assembled structurally in the identical sequence that characterizes the intact template. The product synthesized may be either selectively labeled (e.g., radioactive) or nonlabeled and may be in a form that is free of detectable impurities or other materials with which it is otherwise found in nature.

More specifically, application Ser. No. 535,596, now pending, discloses a controlled system that provides for the synthesis of intact, biologically active nucleic acid in a buffered aqueous in vitro enzymatic system from nucleotide bases, using a selected, intact, biologically active nucleic acid free of detectable levels of destructive material as the template (e.g., input template). When the system produces biologically active "replicas" (identical copies of the same molecular weight) of the nucleic acid template, the process is referred to as one involving "replication." The enzyme catalyst may be referred to as a "polymerase" or "replicase"; when the enzyme catalyst is an RNA-dependent RNA-polymerase, it is defined as a "replicase."

The process or system of the pending application is particularly well suited for synthesizing in vitro biologically active ribonucleic acid (RNA) from ribonucleotide base components (substrates) having high bound energy, using an intact, homologous (contains the information for its specific replicase) biologically active RNA template, a homologous replicase that selectively recognizes the structural program or message of the template, has catalytic activity for the synthesis of intact biologically active RNA from ribonucleotides, and is effectively free of detectable levels of ribonuclease activity and detectable levels of other destructive enzymological activity, and using divalent ions ($Mg^{++}$) as a cofactor. The replication process may be stopped by a number of procedures, the simplest of which involves the cooling of the reaction to a temperature at which the rate of enzymic activity becomes negligible, e.g., 0° C.

The replicase for viral RNA can be obtained either by introducing a selected virus nucleic acid (e.g., bacteriophage) free of any existing protective proteinaceous coat into an uninfected host bacterium cell to synthesize an enzyme which is thought not to preexist in the host cell or, preferably, by introducing an intact bacteriophage (virus particle) into the bacterium cell to synthesize this enzyme.

The injected or intruding viral RNA has a structural program that defines a message that is translated into enzyme protein and this message is conserved during the translation. This enzyme, a homologous replicase (RNA-dependent RNA-polymerase), is separated or isolated from the altered cell and is then purified to remove detectable levels of the usual concurrent ribonuclease activity and other destructive and confounding enzymological activity which is found in the bacterial cell.

The resulting partially purified enzyme, replicase, discriminately recognizes the intact homologous RNA genome of its origin and requires it as a template for normal synthetic replication. Thus, the replicase exhibits a unique and selective dependence on and preference for its homologous viral RNA in exhibiting viral RNA-polymerizing (synthesizing and/or replicating) activity. The replicase exhibits the unique and valuable ability to provide the replication of only intact viral RNA and does not provide for the replication of fragments or foreign sequences or incomplete copies of its own genome. The term "genome" refers to the entire complement of genes in a cell. The genes provide a repository of genetic information for living cells and viruses.

The nucleotide bases or substrate components for viral RNA replication should have sufficiently high bond energy for replication. Satisfactory replication of viral RNA has been achieved with four riboside triphosphates, namely, adenosine triphosphate (ATP), guanosine triphosphate (GTP), cytidine triphosphate (CTP), and uridine triphosphate (UTP).

In replicating infectious viral RNA in vitro, the pending application discloses purifying two different RNA replicases induced in a mutant Hfr strain of *Escherichia coli* (Q-13) by two serologically distinct RNA bacteriophages. The enzyme protein preparations were effectively free of detectable levels of interfering ribonuclease, phosphorylase, and DNA-dependent RNA-polymerase (transcriptase). These isolated enzymes (replicases) showed both a mandatory requirement for template RNA and an ability to mediate prolonged and extensive net synthesis of biologically active polyribonucleotide (RNA). The two replicases exhibited a unique discriminating selectivity in their response to added RNA. Under otherwise optimal conditions, both replicases were virtually inactive with heterologous RNA templates, including ribosomal and s-RNA of the host.

The replicase preparations described in copending application Ser. No. 559,933, filed June 23, 1966, are substantially free of detectable levels of virus particles and infectious viral RNA. In addition, the replicase may be purified so as to be substantially free of contaminants such as carbohydrates, lipids, polynucleotides, and other proteins. The purified biologically active RNA polymerase (replicase) shown in application Ser. No. 559,933, which is substantially free of detectable levels of viral infectivity, and the infective RNA produced with the system and method are intact and are free of impurities or materials with which they are otherwise found in nature. The synthesized viral RNA, for example, is free of the normally occurring protein coating present in the intact viral particle. The controlled RNA product produced with the system and method thus offers the advantage of being useful in experimental, laboratory, and commercial activities where one wishes to use a biologically active RNA that is effectively free of detectable confounding or extraneous materials. This controlled system also is free of detectable confounding or extraneous materials and thus provides an important means for studying the mechanism by which genetic changes and replication occur in life's processes and a means of understanding, modifying, or changing such processes or mechanisms.

The intact viral RNA used in application Ser. No. 535,596 as initiating template was isolated from purified virus. It was obtained by deproteinizing the RNA with phenol and purifying the RNA on sucrose gradients. It was not obtained from the virus-infected bacteria, but from the complete virus particle. The replicases were obtained by introducing viral RNA into an isolated mutant Hfr strain of *E. coli* (Q-13).

Using the in vitro system as referred to in application Ser. No. 535,596, the template was produced, for example, by a factor of $10^{14}$. That is, for each molecule of intact template there was synthesized $10^{14}$ replicas. Further, 5 micrograms (e.g., $3 \times 10^{12}$ strands) of synthesized viral RNA were made very 20 minutes per 0.25 ml. of reaction mixture.

Separation of virus particles from the viral replicase can be achieved by taking advantage of their disparities in size and density. The Qβ virus [J. Bacteriol., 91, 442 (1966)] has a molecular weight of $4.2 \times 10^6$ and a density of 1.43 gm./cm.$^3$. It was unlikely that the replicase would be as large or as dense. Successful purification of the replicase by size and density generates more than the convenience of eliminating virus particles. The same procedure also removes free RNA, replicase complexed to postulated "replicative forms" [cf. Fed. Proceed., 23, 1285 (1964)].

There is described in application Ser. No. 539,933 the further purification of Qβ-replicase by banding in CsCl gradients followed by zonal centrifugation in linear gradients of sucrose. The resulting enzyme is substantially free of virus particles and behaves as a single component in the fractionation procedures. Its molecular weight (110,-000) and density (1.26) precludes association with so-called "replicative forms" or "negative" strands. Its ability to respond to Qβ-RNA by synthesizing infectious copies remains unaltered. The data discourage invoking a cryptic functioning of preexistent RNA (double-or-single-stranded) in the reaction being studied.

At this point of the purification process, while the enzyme (replicase) is substantially free of contaminating phage particles and other enzymes, contamination by other biologically inactive materials still exists. The percentage of enzyme (based upon measurements of activity) in the product at this point is in the range of about 0.05% to 0.5% by weight. Further purification of the enzyme by removal of nonenzymatic biologically inactive materials is achieved by using one or more of the following procedures: (1) absorption on Cγ alumina (aluminum hydroxide gel); (2) isoelectric precipitation; (3) ammonium sulfate fractionation; and (4) adsorption and elution from DEAE cellulose. Such purified preparations retain in their entirety the characteristics of the replicating enzyme.

There is good evidence that the replicase recognizes the particular sequence of nucleotides at the beginning and at the end of the biologically active viral RNA template during the course of replication. It is inferred from this recognition pattern that the intermediate portion of the RNA template is not essential to the direction of or instruction found in the replication mechanism studied. This suggests that the recognition sequences of nucleotides present at the beginning and end of a biologically active RNA template molecule can be selectively bonded to otherwise nonbiologically active or nonviral RNA to produce a synthesized biologically active RNA product. It is thought that the RNA forms a circle and these two recognition sequences of the molecule overlap each other to provide double-stranded regions; such overlapped regions could afford, therefore, identification of the RNA molecule in a single, rapid scanning process.

An RNA template of an in vitro replicating system may be formed in situ. If one were, for example, to introduce foreign bases or nucleotides (e.g., analogous of known bases or nucleotides) into the replicating system, a mutant may be formed which would be the biologically active template for replication with those same bases or nucleotides; in such instances, one would be synthesizing mutants in vitro in a known way.

On a practical basis, the availability of the relatively pure replicase will allow the investigator to move into research areas not previously accessible. Thus one can now proceed to determine the effect of small or large changes in the replicase molecule upon its ability to synthesize RNA; and to determine the change in the biological activity of the RNA so produced by the altered replicase.

Being a protein, and, therefore, made up of a series of amino acids, the structure of the replicase can now be studied, and the relation of its structure to the structure of the RNA produced can give important information, vis-a-vis, structure-activity relationship. Since the replicase is a large molecule and subject to varying degrees of hydrolysis by chemical or enzymatic means, it will be of interest to determine the effect of such hydrolysis, whether they be comparatively minor or major, upon the biological activity of the molecule remaining. In addition, the protein molecule can be subjected to varying degrees of chemical change such as acetylation of its reactive amino or hydroxyl groups, halogenation, nitration, or sulfonation; reaction with nitrous acid should convert the free amino groups of the protein to hydroxyl groups, again with some change in activity.

The discovery of a method to produce an essentially pure biologically active RNA-dependent RNA-polymerase should be useful in the study and/or preparation of products with anti-viral activity, anticancer activity, and hormone and/or enzyme activity. Such research could lead to important therapeutic advancements.

With a purified replicase in hand, it is possible to determine its particular amino acid structure. In addition, with the purified RNA in hand, it should be possible to determine the nucleotide sequence in the RNA, as well as its other structural characteristics. Determination of amino acid structure and coding to give the particular RNA nucleotide sequence should be of importance in elucidating amino acid and nucleotide sequence correlation.

The unique preferences exhibited by the MS-2 and Qβ-replicases which surprised so many are now accepted. Thus, Weissmann and Feix (Proc. Nat'l Acad. Sci., U.S. 55, 1264 (1966)) have confirmed this property with enzyme supplied from this laboratory, and August (Dept. of Molecular Biology, Albert Einstein College of Medicine, Yeshiva University, U.S.A.) found that purified Qβ-replicase which he prepared responds also only to Qβ-RNA. Further, the original (Haruna, et al., Proc. Nat'l Acad. Sci. U.S. 50, 905 (1963)) isolation of MS-2 replicase has been successfully carried out to the stage of complete RNA-dependence by Fiers (Lunteren Symposium on Regulatory Mechanisms' in Nucleic Acid and Protein Biosynthesis (1966)) and his colleagues. They confirmed the specific response to M-2-RNA as well as the autocatalytic kinetics observed (Haruna, et al., Science, 150, 3698 (1965)) when the reaction is initiated at template concentrations below saturation of the enzyme.

The fact that each replicase recognizes its own RNA genome provides an opportunity to examine the basis of the recognition interaction between a protein and a polynucleotide. An obvious device (obvious since the enzyme starts at the beginning and therefore would scan there first) would invoke the initial set of nucleotides, a possibility easily tested by challenging the replicase with fragments of homologous RNA as the template. If the presence of the beginning sequence is the sole requirement, half and quarter RNA fragments should be adequate to initiate synthesis. It was shown (Haruna, et al., Proc. Nat'l Acad. Sci., 54, 1189 (1965)) that this was not the case. Fragments of Qβ-RNA mediate a very slow reaction which soon terminates before ten percent of the input has been synthesized. Furthermore, the product is found (Haruna, et al., Proc. Nat'l Acad. Sci., U.S., 55, 1256 (1966)) in a ribonuclease resistant structure, convertible to sensitivity by heat. This sort of structure is not observed (Haruna, et al., Proc. Nat'l Acad. Sci., U.S. 55, 1256 (1966)) when replicase functions with intact Qβ-RNA and is extensively synthesizing biologically active RNA replicas (Haruna, et al., Proc. Nat'l Acad. Sci., U.S. 55, 1256 (1966)); Spiegelman, et al., Proc. Nat'l Acad. Sci., U.S. 54, 919 (1965); Spiegelman, et al., Proc. Nat'l Acad. Sci., U.S. 55, 1539 (1966); Pace et al., Science, 153, 64 (1966)).

The inability of the replicase to copy fragments means that the enzyme can sense the difference between an intact and fragmented template, implying that some element of secondary structure of the RNA is involved. It was suggested (Haruna et al., Proc. Nat'l Acad. Sci., U.S. 54, 1189 (1965)) that a simultaneous decision on sequence and intactness could be made if the two ends were complementary and formed a double-stranded region, sought for and recognized by the enzyme (replicase).

This mechanism has some interesting testable consequencies in view of the recent demonstration (Haruna et al., Proc. Nat'l Acad. Sci., U.S., 55, 1256 (1966)) that the first five to ten percent of Qβ-RNA synthesized is rich in adenine and poor in uracil. The proposed mechanism would then suggest that the enzyme (replicase) scans for a secondary structure formed by the pairing of two complementary regions, one predominant in A and the other in U. If this is the case, Qβ-replicase might be specifically inhibited by synthetic polynucleotides composed principally of either A or U or both. Conversely, polynucleotides containing mostly C or G should be relatively inert.

The reaction system which synthesizes in vitro the biologically active intact nucleic acid includes two informed components, namely, replicase and biologically active nucleic acid template. It has been discovered that the RNA synthesized in this system is, in fact, a self-duplicating entity, i.e., one which contains the requisite information and directs its own synthesis, and that the RNA, and not the replicase, is the instructive agent in the replicative process. This was substantiated by providing the replicase alternately with two distinguishable RNA molecules, and showing the product produced was always identical to the initiating template. It has been thus established that: the RNA directs its own synthesis; there is no "activation" of preexisting RNA; and the RNA synthesized is a self-duplicating entity.

The discriminating selectivity of the replicase for its own genome as template made it impossible to employ heterologous RNA in the tests which were used to show that the RNA is the instructive agent in the replicative process. Recourse, therefore, was had to mutants. For ease in isolation and simplicity in distinguishing between mutant and wild type, temperature sensitive (ts) mutants were chosen. Their diagnostic pheno-type is poor growth at 41° C. as compared with 34° C. The wild type grows equally well as both temperatures.

An opportunity has been provided for studying the evolution of a self-duplicating nucleic acid molecule outside of a living cell. It was noted that this situation mimics at least one aspect of the earliest precellular evolutionary events when environmental selection operated directly on the genetic material.

As explained above, it has been discovered that intact mutant RNA derived from intact viral RNA can be synthesized in vitro from intact viral RNA, and the synthesized intact mutant RNA can in turn be used as a template and replicated in vitro. One may also start with an intact viral mutant RNA template and replicate in vitro from the template.

I have discovered a process for making and recovering abbreviated biologically active nucleic acids not heretofore available for laboratory or commercial use. More specifically, my invention relates to the discovery that biologically active intact mutant RNA can be synthesized in vitro with the catalytic aid of the normal or specific replicase for the intact homologous viral RNA from which the mutant is derived, so that the size of the mutant decreases, and, correspondingly, its rate of replication increases. An abbreviated mutant is thus biologically active as evidenced by its ability to replicate; however, it is defective or noncompetent in that it cannot yield complete virus particles.

This procedure has enabled me to synthesize the smallest self-duplicating entity now known.

The synthesized biologically active noninfectious intact RNA mutant that is recovered has the unique ability to compete much more actively for the catalytic services of the normal or specific replicase and to replicate faster, as compared with its bigger siblings and the biologically active intact viral RNA from which the mutant is derived. This high affinity for the replicase enables the smaller biologically active intact mutant RNA, which may be an innocuous mutant which has no capacity to complete the viral life cycle, to provide selective means for interfering with viral replication by tying-up and out—competing for the services of the replicase.

Every replication system inherently can make a mistake and produce a mutant, and the conditions of replication can be controlled so that chance of such mistakes occurring can be suppressed or induced. In the event the biologically active intact homologous nucleic acid is altered so that the recognition site of the resulting mutant is retained intact but its secondary structure is modified or discarded so the replicase can scan the mutant faster and identify its recognition sequence faster, then the biologically active intact mutant and its descendants can serve as templates which can replicate faster than the nucleic acid from which they were derived.

The replication system can be encouraged to make mistakes and thereby produce mutants in a number of ways, among which are the following: The replicase can be subjected to ultraviolet light so that it retains its ability for making polynucleotides, but the frequency of error is increased; heat (e.g., 40° C.) may be applied to the replication system, instead of conducting replication at normal replication temperatures (e.g., 35° C.); or the amount of nucleotide base components (triphosphate substrates) present in the replicating system can be limited to the level where synthesis is just able to occur.

I provided a system in which I progressively encourage the biologically active intact mutant to retain its recognition mechanism, but to throw away or discard genetic material (sections of its sequences) which is no longer needed in the in vitro replicating system. Once genetic material is discarded, the mutant is noncompetent in that it does not yield complete virus particles. Although I used a biologically intact temperature sensitive mutant, one may use a biologically active intact mutant which is not temperature sensitive.

More specifically, the intact homologous viral RNA molecule normally has a number of functions to perform in order to effect its replication. It has to carry information for a coat protein; it has to provide information for its specific replicase, including recognition by the replicase; and it has to provide information for at least one other enzyme protein, possibly two. These particular needs, however, are not necessary in my in vitro replicating system, because I provide the system with a replicase and everything that is needed for synthesis, and the mutant could afford to throw away all sections of those genetic materials necessary to perform such functions. In my system such information and related functions were no longer needed; the complete virus particle was not going to be synthesized.

I encouraged the mutant to throw away such unnecessary genetic materials by conducting a serial tarnsfer experiment in which the intervals of synthesis were adjusted to select the earliest molecules completed, and by limiting the amount of triphosphate substrates present in the reaction mixture. As the experiment progressed, the rate of synthesis of mutants increased and the synthesized mutant became smaller but was still biologically active. That is, the time required to finish the first molecules was carefully calibrated, and samples of synthesized material were removed shortly before this calibrated time had elapsed, and this fast transfer procedure was followed for each serial transfer. The selective pressure is then in the direction of selecting for the fastest synthesizing mutant. As the experiment progressed, the rate of mutant synthesis increased and the molecules of mutants synthesized became smaller. By the 7th transfer, the replicating molecule had eliminated about 83% of its original genome to become the smallest known self-duplicating biologically active entity.

If one does not wish the template to decrease in size, one may seed with a fairly large amount of intial template and allow the synthesizing reaction to progress substantially. The replicated product can then be transferred to the next tube. With this type of transfer growth, one encourages the synthesized product to retain its original genotype and accompanying infectivity.

These tests generate an opportunity for studying the gentics and evolution of a self-replicating nucleic acid molecule in a simple and chemically controllable medium. Of particular interest is the fact that such studies can be carried out under conditions in which the only demand made on the molecules is that they multiply; they can be liberated from all secondary requirements (e.g., coding for coat protein, etc.) which serve only the needs and purposes of the complete organism.

Figure 2A:
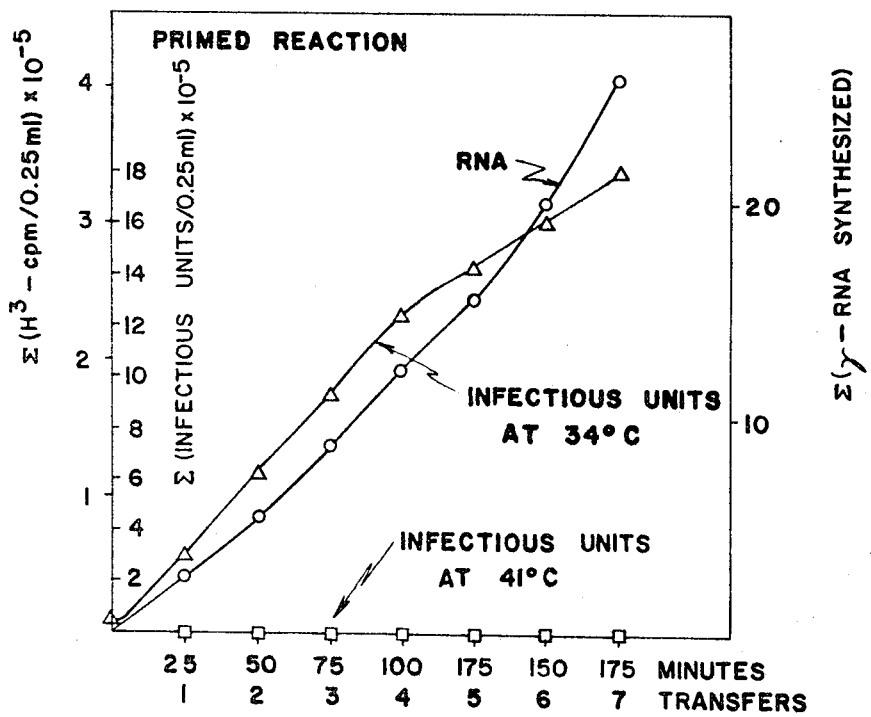

In the accompanying graphs or drawings:

FIGURES 1a through 1c show that the bulk of material synthesized is similar in sedimentation characteristics (size) to ts-$Q\beta$-RNA template derived from virus particles;

FIGURE 2a shows that the synthesized mutant RNA is biologically active, although it also shows that the cumulative infectious units tapper off toward the end as replication progresses. I have found that when the serial transfer experiment was continued to the 7th serial transfer, the replicating mutant molecule eliminated about 83% of its original genome to become the smallest known self-duplicating entity;

FIGURE 2b shows that the mutant RNA template is required for replication.

The following example is illustrative of certain of my discoveries. It will be understood, however, that the invention hereof is not necessarily limited to the particular example, materials, conditions, or procedures described therein.

EXAMPLE

Temperature sensitive mutants of $Q\beta$ were isolated by a modification of the method described by Davern (Australian J. Biol. Sci., 17, 726 (1964)). *E. coli* K38, kindly supplied by Dr. N. Zinder of Rockefeller University, was grown in a rotary shaker at 34° C. in modified 3XD medium (Fraser, D., and E. A. Jerrel, J. Biol. Chem., 205, 291 (1953)) to an O.D.$^{660}$ of 0.15. $Q\beta$ bacteriophage was added to a multiplicity of 5, the suspension mixed and allowed to stand for adsorption of virus at 34° C. for five minutes. Shaking was reinstituted for ten minutes, whereupon 20 μg. of 5-fluorouracil were added per ml. of culture and the incubation continued for two hours. The resulting lysate was cleared by low speed centrifugation, and plated for plaques arising at 34° C. Isolated plaques were stabbed with a needle and suspended in 1 ml. of water. A small loopful of the suspension was transferred to each of the two plates seeded with *E. coli* K38, and respective plates were incubated at 34° C. or 41° C. Plaques arising only at 34° C. were picked for further testing, and those which retained the ts-phenotype were chosen. Mutant virus particles isolated in this manner are quite stable to passage and possess low efficiencies of plating at 41° C. (Table I below). To provide a supply of mutant RNA, large lysates were prepared from plaque inocula of the ts-$Q\beta$ and RNA was isolated from the virus as previously described (Haruna, I., and S. Spiegelman, Proc. Nat'l Acad. Sci., U.S., 54, 1189 (1965)).

Table I below shows the relative efficiency of plating at 34° C. and 41° C. In obtaining the data for Table I, dilutions were plated with *E. coli* K38 as the indicator organism, and duplicate plating series were incubated at 34° C. and 41° C. The relative efficiency of plating (REOP) of 100 is defined relative to the plaque forming units (PFU) observed at 34° C.

TABLE I

| Virus | | 34° C. | 41° C. |
|---|---|---|---|
| $Q\beta$ | REOP | 100 | 100. |
| | PFU | $1.14 \times 10^{12}$/ml | $1.16 \times 10^{13}$/ml. |
| ts-$Q\beta$ | REOP | 100 | $2.5 \times 10^{-2}$ |
| | PFU | $4.4 \times 10^{7}$/ml | $1.1 \times 10^{4}$/ml. |

The data of Table I above demonstrate that the ts-phenotype is easily recognized by parallel platings of intact virus particles at 34° C. and 41° C. on receptor cells. It remained, however, to see whether this difference would be retained when the corresponding purified mutant RNA preparations were assayed for infectivity in the protoplast system. This check is particularly necessary, since one of the steps requires a ten minute incubation of the infected protoplasts at 35° C. During this interval "revertants" could be produced and add to the background of plaques developing at 41° C. In addition, it was necessary to establish that the synthetic product of the replicase, primed by a normal $Q\beta$-RNA, behaves like the natural viral RNA in its behavior at 41° C. Table II below summarizes the results of the experiments performed to check these points.

More specifically, Table II below shows the efficiency of infection of protoplasts by three RNA preparations. In obtaining the data for Table II, infectious RNA assays were carried out on $Q\beta$-RNA, synthetic $Q\beta$-RNA, and ts-RNA. Duplicate pairs were incubated at 34° C. and 41° C. Efficiencies at 34° C. are defined as 100. The synthetic $Q\beta$-RNA was the result of a 20-fold synthesis carried out by $Q\beta$ replicase purified through CsCl and sucrose centrifugation, using 0.1 μg. $Q\beta$-RNA to initiate the standard reaction. REOP and PFU are as defined with respect to Table I above.

TABLE II

| RNA species | | 34° C. | 41° C. |
|---|---|---|---|
| Natural $Q\beta$-RNA | REOP | 100 | 93. |
| | PFU | $4.56 \times 10^{5}$/ml | $4.24 \times 10^{5}$/ml. |
| Synthetic $Q\beta$-RNA | REOP | 100 | 92. |
| | PFU | $2.90 \times 10^{6}$/ml | $2.66 \times 10^{6}$/ml. |
| Natural ts-$Q\beta$-RNA | REOP | 100 | 1.5. |
| | PFU | $1.86 \times 10^{6}$/ml | $2.75 \times 10^{4}$/ml. |

It is evident that the synthetic wild type $Q\beta$-RNA behaves exactly like its natural counterpart at the two temperatures. On the other hand, the ts-$Q\beta$-RNA again shows the lower efficiency at 41° C., although it will be noted that the background at 41° C. is higher than in the intact cell assay (Table I above), as was expected. The 65-fold difference at the two temperatures is, however, more than adequate for a clear diagnosis.

It is evident that the system aavilable will permit us to determine whether the product produced by a normal replicase primed with ts-Qβ-RNA is mutant or wild type. As in previous investigations, this is best done by a serial transfer experiment to avoid the ambiguity of examining reactions containing signficant quantities of the initiatng RNA. Accordingly, seven standard reaction mixtures (0.25 ml.) were prepared, each containing 60 µg. of Qβ replicase isolated from cells infected with normal virus and purified through the CsCl banding sucrose sedimentation steps (Guthrie, G. D., and R. L. Sinsheimer, Biochem. Biophys. Acta, 72, 290 (1963)). To the first reaction mixture was added 0.2 µg. of RNA and synthesis allowed to proceed at 35° C. After a suitable interval, 1/10 of this reaction mixture was used to initiate a second reaction which, in turn, was diluted into a third reaction mixture, and so on for seven transfers. A control series was carried out in a manner identical to that just described, save that *no* RNA was added to the first tube.

Aliquots from each reaction mixture were examined for radioactivity in RCA-precipitable material and assayed for infectious RNA at 34° C. and 41° C. In addition, samples from reactions 1, 4, and 7 were examined for physical similarity to the input RNA by sedimentation through sucrose gradients. As may be seen from FIGURES 1a through 1c, the bulk of material synthesized is similar in sedimentation characteristics to ts-Qβ-RNA derived from virus particles.

In obtaining the data for FIGURES 1a through 1c, .04 ml. from reaction mixtures 1, 4, and 7 (see Table III below) were each mixed with .01 ml. $p^{32}$-Qβ-RNA, .01 ml. 20 percent sodiumdodecylsulphate, and .20 ml. TM, and layered onto linear gradients of 2.5 percent to 15 percent sucrose in .01 M tris, pH 7.4; .005 M $MgCl_2$; .1 M NaCl. Gradients were centrifuged at 10° C. for 14 hours in the Spinco SW–25 rotor. Fractions were collected and analyzed for c.p.m. as described previously (Haruna, I, and S. Spiegelman, Science, 150, 884 (1965)).

Table III below records a complete account of such a serial transfer experiment. The procedure set forth immediately after Table III provides the details necessary to follow the assays and calculations.

tris, pH 7.4; .005 M $MgCl_2$; and used immediately. Columns 1 and 2 give the reaction number and total time elapsed during the experiment. Column 3 lists acid-precipitable c.p.m. found in each 0.25 ml. reaction mixture and column 4 lists the corresponding sum. Similarly, columns 5 and 6 list the RNA formation during each reaction and their cumulative amounts. Columns 7 and 8 present c.p.m. incorporated in the control transfer *without* added RNA. Columns 9 and 10 are the averages of plaques observed on duplicate plates in the assays for infectious RNA, on plates incubated at 34° C. and 41° C. In all cases, reaction products were diluted $1.6 \times 10^{-3}$ during the course of the assay. Column 11 presents the actual number of infectious units appearing in each reaction tube, and column 12 is the sum of infectious units appearing at 34° C.

If one first focuses attention of the RNA formation in the experimental series (columns 3–6 of Table III above), it is evident that ts-Oβ-RNA serves as an excellent initiator for the normal replicase. Included also are the c.p.m. observed in the nonprimed control series (columns 7 and 8). No detectable synthesis occurs in the first three tubes although a few c.p.m. accumulate near the end which are, however, negligible from the point of view of the chemical amounts of RNA synthesized. Though quantitatively insignificant, this "long-term background" is persistently observed with some enzyme preparations and is under further investigation.

Columns 9 and 10 of Table III above give the actual number of plaques counted in the assay for infectious units at each transfer, the numbers representing the average of two duplicate plates. Comparison of columns 9 and 10 reveal that the relative number of plaque formers at the two temperatures agree with those obtained with the original ts-Qβ-RNA (Table II above) in the protoplast assay. The proportions of plaques seen at 41° C. (column 10) is not significantly different from the expected 1–2 percent of the numbers developing at 34° C. It is evident that the ts-phenotype of the initiating ts-Qβ is faithfully inherited. Column 11 gives the number of ts-infectious units per reaction mixture calculated from the dilution used and column 12 lists the corresponding cumulative sums.

It should be noted that no evidence of the synthesis of infectious RNA which could produce plaques at either 34° C. or 41° C. appeared in the control nonprimed reac-

TABLE III

| | | Formation of RNA | | | | | | Formation of infectious units with RNA | | | |
|---|---|---|---|---|---|---|---|---|---|---|---|
| | | With RNA | | | | Without RNA | | | | | |
| Transfer No. | Time (min.) | Radioactivity (count/min. $\times 10^{-5}$) | | Amt. RNA | | Radioactivity (count/min. $\times 10^{-5}$) | | PFU observed | | Infectious units $\times 10^{-5}$ at 34° C. | |
| | | Each | Sum | Each (µg.) | Sum (µg.) | Each | Sum | 34° C. | 41° C. | Each | Sum |
| 1 | 2 | 3 | 4 | 5 | 6 | 7 | 8 | 9 | 10 | 11 | 12 |
| 1 | 25 | 0.446 | 0.446 | 2.86 | 2.86 | 0 | 0 | 487 | 9 | 3.04 | 3.04 |
| 2 | 50 | .418 | .864 | 2.68 | 5.54 | 0 | 0 | 486 | 10 | 3.04 | 6.08 |
| 3 | 75 | .560 | 1.424 | 3.59 | 9.13 | 0 | 0 | 500 | 12 | 3.12 | 9.20 |
| 4 | 100 | .508 | 1.932 | 3.26 | 12.39 | 0.002 | 0.002 | 464 | 4 | 2.90 | 12.10 |
| 5 | 125 | .527 | 2.459 | 3.38 | 15.77 | .012 | .014 | 299 | 6 | 1.87 | 13.97 |
| 6 | 150 | .685 | 3.149 | 4.39 | 20.16 | .0007 | .014 | 295 | 5 | 1.85 | 15.82 |
| 7 | 175 | .927 | 4.071 | 5.94 | 26.10 | .004 | .018 | 289 | 2 | 1.81 | 17.63 |

In obtaining the data for Table III above, each 0.25 ml. standard reaction mixture (Haruna, I., and S. Spiegelman, Proc. Nat'l Acad. Sci., U.S., 54, 579 (1965)) contained 60γ Qβ replicase purified through CsCl and sucrose centrifugation, and $H^3$-CTP at a specific activity such that 15,600 c.p.m. signifies 1γ synthesized RNA. The first reaction was initiated by addition of 0.2γ ts RNA. Each reaction was carried out at 35° C. for 25 minutes, whereupon .02/ml. were drawn for counting, and 0.025 used to prime the next reaction. All samples were stored frozen at −70° C. until infectivity assays were carried out. Dilutions for infectious RNA assays were made into .01 M tion. The corresponding negative columns are therefore omitted from Table III above.

The average infective efficiency of the RNA in the protoplast assay is $2 \times 10^{-7}$. The initial input in tube 1 was 0.2 γ corresponding to $1.2 \times 10^{11}$ strands and $2.4 \times 10^4$ plaque forming units. Since each transfer involves a 1 to 10 dilution, it is clear that *less than one* of the $1.87 \times 10^5$ plaque formers observed in the 5th tube can be ascribed to the initiating ts-Qβ-RNA. Finally, by tube 7 which contains $3.6 \times 10^{12}$ new strands, the number of plaque formers ($1.8 \times 10^5$) exceeds in *absolute* terms the number ($1.2 \times 10^4$) of old strands present. It is clear that the serial dilution experiment has demonstrated the appearance of newly synthesized infectious RNA possessing the temperature-sensitive phenotype.

FIGURE 2a summarizes visually the outcome of the experiment detailed in Table III above by plotting against time the cumulative sums of the RNA synthesized (column 6) and plaque formers at 34° C. (column 12). FIGURE 2a shows that the synthesized mutant RNA is biologically active. The fact that the plaque formers at 41° C. are not statistically above the background of the assay of ts-Qβ-RNA means that no detectable wild type Qβ-RNA has been produced, a fact indicated by the open squares. For comparison, the control reaction recorded in Table III above in which the initiating RNA was omitted, is similarly plotted on the same scale in FIGURE 2b. FIGURE 2b shows that the mutant RNA template is required for replication. No significant synthesis of either RNA or infectious units were observed.

It is apparent from the experiments referred to above that one and the same normal replicase can produce distinguishably different but genetically related RNA molecules. The genetic type produced is completely determined by the RNA used to start the reaction and is always identical to it. The following two conclusions would appear to be inescapable from these findings: (i) the RNA is the instructive agent in the replicating process and therefore satisfies the operational definition of a self-duplicating entity; (ii) it is not some cryptic contaminant of the enzyme but rather the input RNA which multiplies.

The following question was studied: What are the evolutionary consequences if the only demand made on the RNA molecules is that they multiply? To answer these and related issues, a serial transfer experiment was performed in which the intervals of synthesis were adjusted to select the earliest molecules completed. As the experiment progressed, the rate of RNA synthesis increased and the product became smaller. By the 7th transfer, the replicating molecule had eliminated 83% of its original genome to become the smallest known self-duplicating entity.

Aside from their intrinsic interest, such studies can provide insight into a number of central issues. Thus, they show that the smallest self-duplicating entity which can be constructed by such devices and provide much simpler objects for analyzing the replicative process. Further, the sequences involved in the recognition mechanism between template and enzyme must be retained, leading to their enrichment in the smaller molecules which evolve. Finally, these abbreviated RNA molecules have a very high affinity for the replicase but are not longer able to direct the synthesis of virus particles. This feature opens up a novel pathway toward highly specific means for interferring with viral replication.

I claim:

1. The method of synthesizing in vitro a biologically active intact ribonucleic acid by providing a replicating system in vitro capable of synthesizing biologically active ribonucleic acid, which system includes a biologically active intact ribonucleic acid template; a replicase that is free of detectable destructive contaminants and which will recognize the intact ribonucleic acid of its origin; the nucleotide base components adenosine triphosphate, guanosine triphosphate, cytidine triphosphate, uridine triphosphate; and the divalent magnesium ions as an activating cofactor; incubating said system in vitro and selecting the fastest synthesized mutant by recovering said mutant before the ribonucleic acid is fully synthesized.

2. The method of claim 1 wherein said synthesized ribonucleic acid is a ribonucleic acid of reduced molecular size, as compared with the template, and which retains its recognition mechanism.

3. The method of claim 1 wherein the template is a mutant.

4. The method of claim 1 wherein the template is a competent mutant.

5. The method of claim 1 wherein the template is a noncompetent mutant.

6. The method of claim 1 wherein said synthesized nucleic acid is of reduced size, as compared with the template, and is recovered from said system after replication.

7. The method of synthesizing in vitro biologically active intact ribonucleic acid mutants having their recognition mechanism, which method comprises: providing an in vitro, enzymatic, self-duplicating system having (a) a biologically active intact ribonucleic acid template, (b) a replicase which will recognize the intact ribonucleic acid of its origin, said replicase being free of detectable nuclease activity and destructive enzymological activity, (c) the nucleotide base components adenosine triphosphate, guanosine triphosphate, cytidine triphosphate, uridine triphosphate, and (d) divalent magnesium ions as an activating cofactor; incubating said system in vitro to synthesize biologically active intact mutants having their recognition mechanism; and recovering said synthesized mutants produced from said system.

8. The method of claim 7 wherein said template is a competent RNA mutant.

9. The method of claim 7 wherein said template is a noncompetent RNA mutant.

10. The method of claim 7 wherein said synthesized ribonucleic acid is a ribonucleic acid of reduced size, as compared with the template.

11. The method of synthesizing in vitro biologically active intact noncompetent abbreviated ribonucleic acid mutants from biologically active intact competent ribonucleic acid template in the presence of a replicating system in vitro which includes the replicase which will recognize the intact ribonucleic acid of its origin; the nucleotide base components, adenosine triphosphate, guanosine triphosphate, cytidine triphosphate, uridine triphosphate; and divalent magnesium ions as activating cofactors; which method comprises retaining in vitro the recognition mechanism of the replicating molecules but incubating the template to dispose of nonessential secondary genetic sequences during replication, and recovering the resulting biologically active noncompetent abbreviated ribonucleic acid mutant.

12. The method of claim 11 wherein the template is a mutant.

13. The method of claim 11 wherein the template is a viral mutant.

14. The method of synthesizing in vitro biologically active intact noncompetent abbreviated ribonucleic acid mutants from biologically active intact noncompetent ribonucleic acid template in the presence of an in vitro replicating system which includes the replicase which will recognize the intact ribonucleic acid of its origin; the nucleotide base components, adenosine triphosphate, guanosine triphosphate, cytidine triphosphate, uridine triphosphate; and divalent magnesium ions as activating cofactors; which method comprises retaining in vitro the recognition mechanism of the replicating molecules during replication but incubating the template to dispose of nonessential secondary genetic sequences during replication, and recovering the resulting biologically active noncompetent abbreviated ribonucleic acid mutant.

15. The method of claim 14 wherein the template is a mutant.

References Cited

Haruna et al.: Proc. Nat'l Acad. Sci., vol. 50, pages 905–911 (1963).

ALVIN E. TANENHOLTZ, *Primary Examiner.*

U.S. Cl. X.R.

195—62, 66; 260—211.5